(12) United States Patent
Huang et al.

(10) Patent No.: US 10,858,179 B2
(45) Date of Patent: Dec. 8, 2020

(54) TIPPING HOPPER AND CONTROL METHOD THEREOF

(71) Applicant: CISDI ENGINEERING CO., LTD, Chongqing (CN)

(72) Inventors: Qiming Huang, Chongqing (CN); Zhan Gao, Chongqing (CN); Weizhi Shi, Chongqing (CN); Cunzhen Tan, Chongqing (CN); Yongmen Wang, Chongqing (CN)

(73) Assignee: CISDI ENGINEERING CO., LTD., Chongqing (CN)

( * ) Notice: Subject to any disclaimer, the term of this patent is extended or adjusted under 35 U.S.C. 154(b) by 116 days.

(21) Appl. No.: 15/850,262

(22) Filed: Dec. 21, 2017

(65) Prior Publication Data

US 2018/0297777 A1  Oct. 18, 2018

(30) Foreign Application Priority Data

Apr. 17, 2017 (CN) .......................... 2017 1 0249566

(51) Int. Cl.
| | |
|---|---|
| *B65D 88/56* | (2006.01) |
| *B60P 1/28* | (2006.01) |
| *B60P 1/12* | (2006.01) |
| *B65G 65/23* | (2006.01) |

(52) U.S. Cl.
CPC ................ *B65D 88/56* (2013.01); *B60P 1/12* (2013.01); *B60P 1/283* (2013.01); *B65G 65/23* (2013.01)

(58) Field of Classification Search
CPC . B60P 1/12; B60P 1/283; B65D 88/56; B65G 65/23

(Continued)

(56) References Cited

U.S. PATENT DOCUMENTS

| | | | | | |
|---|---|---|---|---|---|
| 1,278,460 | A | * | 9/1918 | Hanger ..................... | B60P 1/12 298/19 R |
| 1,301,338 | A | * | 4/1919 | Uhlrig ...................... | B60P 1/12 298/19 R |

(Continued)

FOREIGN PATENT DOCUMENTS

FR  551384  *  4/1923  ................ B60P 1/12

OTHER PUBLICATIONS

Machine translation of FR551384 from espacenet, accessed on Sep. 19, 2019 (Year: 1923).*

*Primary Examiner* — Mark C Hageman
(74) *Attorney, Agent, or Firm* — Michael D. Eisenberg

(57) ABSTRACT

A tipping hopper includes a hopper body, hopper rotating supports and a tipping mechanism. The tipping mechanism comprises a connecting rod and a crank. One end of the connecting rod is hinged on the hopper body, and the other end is hinged with one end of the crank; and the other end of the crank is hinged on a crank rotating support through a crank rotating shaft. By optimizing a crank starting point and a crank end point, ensure hopper's position of receiving and discharging material is arranged at or near a dead point of the tipping mechanism so that the working condition of an impact force borne by a speed reducer device is optimized when the tipping hopper is charged and discharged. The mechanism also optimizes the position of the center of gravity of the hopper body and the position of the center of gravity of a charged hopper, so that the center of gravity of the hopper body is located between a hopper rotating hinge point and the connecting rod support hinge point near the hopper rotating hinge point. A force amplification effect of the connecting rod is used to greatly reduce the requirement for the output moment of the speed reducer, thereby greatly reducing the weight of the speed reducer device and the (Continued)

power of a tipping motor and saving motor power and energy consumption of a hoisting system.

9 Claims, 3 Drawing Sheets

(58) Field of Classification Search
USPC .............. 414/182, 192, 207, 639–642, 425;
298/22 J, 22 D
See application file for complete search history.

(56) References Cited

U.S. PATENT DOCUMENTS

| | | | | | |
|---|---|---|---|---|---|
| 1,356,879 | A | * | 10/1920 | Newton | B60P 1/12 298/21 R |
| 1,423,638 | A | * | 7/1922 | Ackerman | B60P 1/12 298/19 R |
| 1,475,936 | A | * | 12/1923 | Couls | B60P 1/12 298/21 R |
| 1,529,374 | A | * | 3/1925 | Pounder | B60P 1/12 298/19 R |
| 1,572,876 | A | * | 2/1926 | Barker | B60P 1/12 298/21 R |
| 1,612,489 | A | * | 12/1926 | Clark | B60P 1/12 298/19 R |
| 1,787,892 | A | * | 1/1931 | Bordeaux | B60P 1/12 298/19 R |
| 1,823,833 | A | * | 9/1931 | Kyle | B60P 1/12 298/19 R |
| 2,241,953 | A | * | 5/1941 | Maher | B60P 1/06 298/14 |

\* cited by examiner

TIPPING HOPPER AND CONTROL METHOD THEREOF

CROSS-REFERENCE TO RELATED APPLICATIONS

This application claims the priority, under 35 U.S.C. §§ 119, 120, 172, 363, 365, and 371, of China Patent Application No. 201710249566.1, filed Apr. 17, 2017; the prior application is herewith incorporated by reference in its entirety.

STATEMENT REGARDING FEDERALLY SPONSORED RESEARCH OR DEVELOPMENT

Not Applicable

FIELD OF THE INVENTION

The present invention belongs to the field of material conveyance or handling, and particularly relates to a tipping hopper and a control method thereof.

BACKGROUND OF THE INVENTION

A tipping hopper is a common charging and discharging mechanical device. A tipping mechanism of the tipping hopper determines operation quality of the tipping hopper to a large extent.

Charging and tipping functions of the tipping hopper can be realized mechanically through many design methods, including oil cylinder hydraulic driving, electrohydraulic push rod driving, electric push rod driving, speed reducer direct driving and the like. The above methods have advantages and disadvantages. For example, the electrohydraulic push rod driving method has the advantages of simple device and light weight, but the thrust is small in use and reliability is poor. The oil cylinder hydraulic driving method needs to be equipped with a hydraulic system, and the system (including various valves, motors, sensors and the like) and control are relatively complicated and maintenance points are multiple. A mechanical tipping (e.g., a speed reducer) action is reliable and stable, and convenient in control, but a mechanical device is heavy in weight and high in investment.

Different tipping mechanisms of tipping hoppers are selected under different operating conditions. For some occasions, such as a lifting type tipping hopper (unmanned random operation), high device reliability, convenient control and long-term no maintenance are needed, and mechanical tipping (speed reducer) is a feasible selection. However, heavy device weight may increase the capability of the tipping hopper for lifting a driving mechanism and the structural weight of a related supporting system. If a mechanism which can greatly reduce mechanical tipping power of the hopper and can also decrease the weight of a tipping driving device is found, perfect unification of a mechanical tipping hopper in reliability, weight, safety and system maintenance can be realized.

SUMMARY OF THE INVENTION

In view of this, the purpose of the present invention is to provide a tipping hopper with a smaller mechanical tipping mechanism, so as to realize reliable mechanical tipping actions of the tipping hopper through an optimized mechanism and reduce power consumption and device weight.

To achieve the above purpose, the present invention provides the following technical solution: A tipping hopper comprises a hopper body and hopper rotating supports, wherein the tipping hopper further comprises a tipping mechanism hinged at a rear of the hopper body; the tipping mechanism comprises a connecting rod and a crank; one end of the connecting rod is hinged on the hopper body, and the other end is hinged with one end of the crank; the other end of the crank is hinged on a crank rotating support through a crank rotating shaft; the center of gravity of the hopper body is located between a hopper rotating hinge point and a connecting rod support hinge point near the hopper rotating hinge point; the hopper rotating hinge point is a hinge point between the hopper body and the hopper rotating supports; and the connecting rod support hinge point is a hinge point between the connecting rod and the hopper body.

Further, two groups of hopper rotating supports are symmetrically hinged in middle of the hopper body and located on both sides of the tipping mechanism.

Further, one end of the connecting rod can get around a bent connecting rod of the crank rotating shaft.

Further, the crank rotating shaft is connected with a torque speed reducer.

Further, a blocking material plate which is installed relatively fixedly in a front discharge hole of the hopper.

A control method of the above tipping hopper comprises the following steps:

(1) when the hopper body is in a horizontal state or is in a material receiving position, the crank rotating shaft is located on or near a connecting line of two hinge points on the connecting rod so that the tipping mechanism is in or near a dead point position; and (2) when the hopper body is in a discharging position, the crank rotating shaft is located on or near an extension line of a connecting line of two hinge points on the connecting rod so that the tipping mechanism is in or near another dead point position.

Further, the method further comprises controlling the center of gravity of a charged hopper so that the center of gravity of the charged hopper is located between the hopper rotating hinge point and the connecting rod support hinge point near the hopper rotating hinge point.

The present invention has the following beneficial effects:

1) By optimizing a crank starting point (the crank rotating shaft is on or near the connecting line of two hinge points of a bent connecting rod, and the point is a material receiving point of the tipping hopper) and optimizing a crank end point (the crank rotating shaft is on or near the extension line of two hinge points of a bent connecting rod, and the point is a discharging point of the tipping hopper), the material receiving point and the discharging point of the hopper are arranged at or near a dead point of the tipping mechanism so that the working condition of an impact force borne by a speed reducer device is optimized when the tipping hopper is charged and discharged.

2) The mechanism also optimizes the position of the center of gravity of the hopper body and the position of the center of gravity of a charged hopper. In a region with a large tipping moment, a force amplification effect of the connecting rod is used to greatly reduce the requirement for the output moment of the speed reducer, thereby greatly reducing the weight of the speed reducer device and the power of a tipping motor and saving motor power and energy consumption of a hoisting system.

3) The tipping of the hopper body is full-mechanical transmission, realizing high transmission efficiency, high safety, reliable device operation and maintenance-free system. The existing device can be directly improved, so that the hopper body is particularly suitable for adverse dust working conditions and control is simple and convenient.

4) Besides satisfying the structural need of the mechanism, the bent connecting rod can also provide elastic buffer for the entire mechanical tipping system.

5) The technology is suitable for occasions that need high frequency work and high reliability (such as a tipping hopper for spatial lifting motion), can replace oil cylinder or electrohydraulic push rod driven tipping hoppers, and realize tipping charging with high reliability.

6) A blocking material plate which is installed relatively fixedly is provided with a discharge hole of the hopper; the plate and the hopper can make a scarp vessel; and the blocking material prevents scraps from falling down from the hopper when charging and conveying to keep the safety of production.

BRIEF DESCRIPTION OF THE DRAWINGS

To enable the purpose, the technical solution and the advantages of the present invention to be more clear, the present invention provides the following drawings for description.

DETAILED DESCRIPTION OF THE EMBODIMENTS

Figure 1:
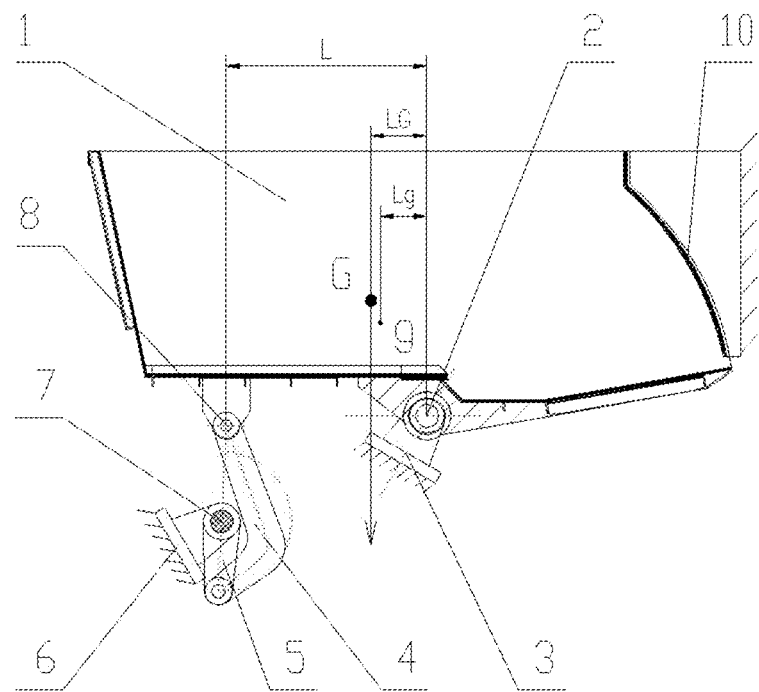
FIG. 1 is a structural diagram of a tipping hopper of the present invention (a horizontal material receiving position of the hopper)
Figure 2:
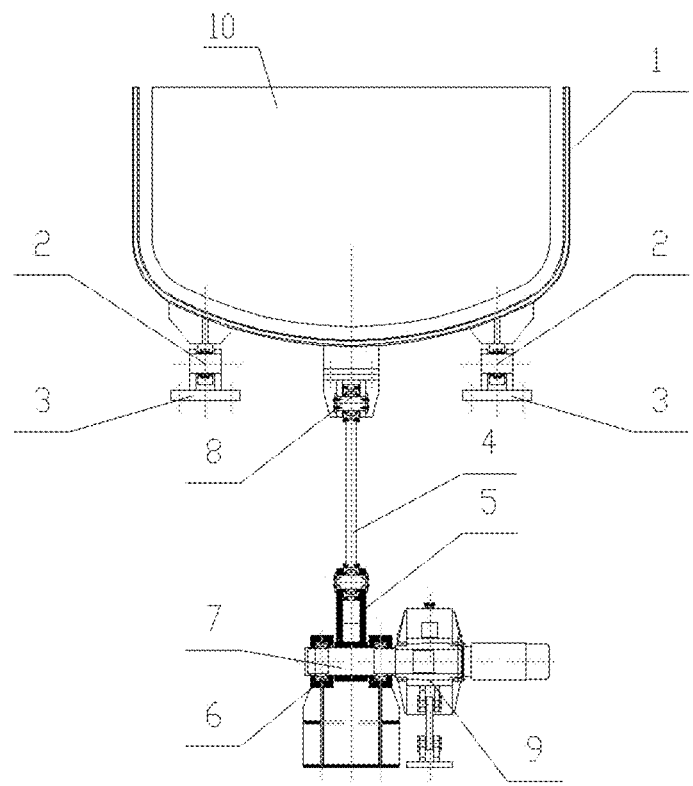
FIG. 2 is a longitudinal sectional view of FIG. 1.

Preferred embodiments of the present invention will be described below in detail in combination with drawings.

As shown in the figure, the tipping hopper in the present invention comprises a hopper body 1 and hopper rotating supports 3, wherein the tipping hopper further comprises a tipping mechanism hinged at a rear of the hopper body 1; the tipping mechanism comprises a connecting rod 4 and a crank 5; one end of the connecting rod 4 is hinged on the hopper body 1, and the other end is hinged with one end of the crank 5; the other end of the crank 5 is hinged on a crank rotating support 6 through a crank rotating shaft 7; the center of gravity g of the hopper body 1 is located between a hopper rotating hinge point 2 and a connecting rod support hinge point 8 near the hopper rotating hinge point 3; the hopper rotating hinge point 2 is a hinge point between the hopper body 1 and the hopper rotating supports 3; and the connecting rod support hinge point 8 is a hinge point between the connecting rod 4 and the hopper body 1.

A blocking material plate 10 which is installed relatively fixedly in a front discharge hole 1 of the hopper.

In the present embodiment, two groups of hopper rotating supports 3 are symmetrically hinged in front of the hopper body 1 and located on both sides of the tipping mechanism. Two groups of hopper rotating supports 3 and the tipping mechanism form a tippable three-point support which is simple, stable and reliable in structure. Of course, eight connecting rod supporting hinge points are formed herein, and are hinged with the connecting rod through a rotating shaft to realize multi-point support. The hopper rotating supports 3 and the crank rotating support 6 can be fixedly installed on a related structure, such as a vehicle frame.

The connecting rod4 is a bent connecting rod which can rotate with the crank rotationg shaft 7. The structure can enable the connecting rod to avoid the interference of the crank rotating shaft 7, so that the tipping mechanism is in a dead point position.

The crank rotating shaft 7 is connected with a torque speed reducer 9 in the present embodiment.

Considering the influence of possibility of sliding down from the tipping hopper by scraps in lifting, conveying and charging, a blocking material plate fixed relatively is arranged in the front the discharge hole of the tipping hopper. The blocking material plate and the hopper can make a scarp vessel in transport, and prevents scraps from sliding down from the hopper when charging and conveying to keep the production safety. When the tipping hopper is tipped in a discharging position, the tipping hopper is controlled to rotate and swing, and the discharge hole of the tipping hopper is separated from the blocking material plate to form a discharging channel CC.

A control method of the above tipping hopper comprises the following steps:

(1) when the hopper body 1 is in a horizontal state or is in a material receiving position, the crank rotating shaft 7 is located on or near a connecting line of two hinge points on the connecting rod 4 so that the tipping mechanism is in or near a dead point position; and (2) when the hopper body 1 is in a discharging position, the crank rotating shaft 7 is located on or near an extension line of a connecting line of two hinge points on the connecting rod 4 so that the tipping mechanism is in or near another dead point position.

When the mechanism is operated, the torque speed reducer 9 transmits the torque to the crank 5 through the crank rotating shaft 7. Force for pushing the hopper body 1 to tip is generated on the connecting line of two hinge points of the bent connecting rod. By optimizing a crank starting point (the crank rotating shaft is on or near the connecting line of two hinge points of a bent connecting rod, and the point is a material receiving point of the tipping hopper) and optimizing a crank end point (the crank rotating shaft is on or near the extension line of two hinge points of a bent connecting rod, and the point is a discharging point of the tipping hopper), the material receiving point and the discharging point of the hopper are arranged at or near a dead point of the tipping mechanism so that the working condition of an impact force borne by a speed reducer device is optimized when the tipping hopper is charged and discharged. For example, during charging, the crank rotating shaft is arranged on or near the connecting line of two hinge points of the bent connecting rod. At this moment, although a large impact force is generated in the charging process, because a rotating radius is close to 0, the impact force may not be fed back to impact a gear of the speed reducer in a torsional form. The impact force is borne by a rotating shaft supporting structure, thereby enhancing reliability of the speed reducer as a core component. The discharging point is similar to this.

As a further improvement of the above solution, the method further comprises controlling the center of gravity of a charged hopper so that the center of gravity of the charged hopper is located between the hopper rotating hinge point 2 and the connecting rod support hinge point 8 near the hopper rotating hinge point.

The mechanism also optimizes the position of the center of gravity of the hopper body and the position of the center of gravity of a charged hopper. In a region with a large tipping moment, a force amplification effect of the connecting rod is used to greatly reduce the requirement for the output moment of the speed reducer, thereby greatly reducing the weight of the speed reducer device and the power of a tipping motor and saving motor power and energy consumption of a hoisting system. This is mainly because the tipping mechanism slowly tips the hopper in a region with a larger moment, and tips the hopper at normal speed in a region with a smaller moment in the tipping process of the hopper.

Figure 3:
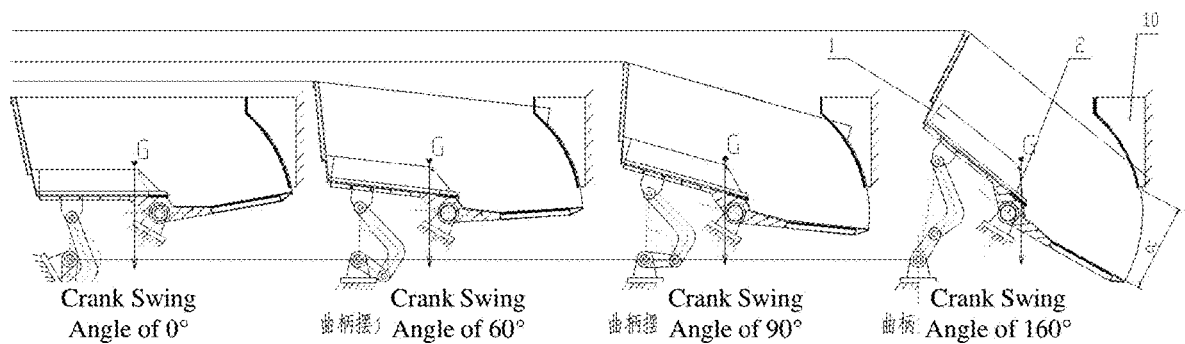
FIG. 3 is a schematic diagram of a crank swing angle and an inclined angle of a hopper body in a tipping process of a hopper.

A crank swing angle and an inclined angle of a hopper body in the tipping process of the hopper are shown in FIG. 3. The figure shows a connection rod motion relationship that the hopper body is tipped from a horizontal material receiving position to a discharging position in a crank swing range of 0° to 160°.

When the crank swing angle is 0°, two hopper rotating supports are arranged in front of the hopper body; at least one connecting rod supporting hinge point is formed at a rear; the root of the crank 5 is installed on the crank rotating shaft 7, and the other end is hinged with one end of the bent connecting rod; the bent connecting rod avoids the interference of the crank rotating shaft 7; and the crank rotating shaft is on or near the connecting line of two hinge points of the bent connecting rod. The discharging hole of tipping hopper is totally blocked by the blocking plate.

When the crank swing angle is 60°, the hopper body 1 is slightly tipped and the bent connecting rod slightly swings outwards. The discharging hole of tipping hopper starts to generate a narrow gap between the blocking plate.

When the crank swing angle is 90°, the hopper body 1 is tipped with a certain angle and the bent connecting rod continues to swing outwards. The discharging hole of tipping hopper starts to generate a wide gap between the blocking plate.

When the crank swing angle is 160° (or the corner is larger), the hopper body 1 reaches a material tipping angle and the crank rotating shaft 7 is near the extension line of the connecting line of two hinge points of the bent connecting rod. there is a large gap CC between the discharging hole of tipping hopper and the blocking material plate CC to form a channel for scraps to slide down.

Figure 4:
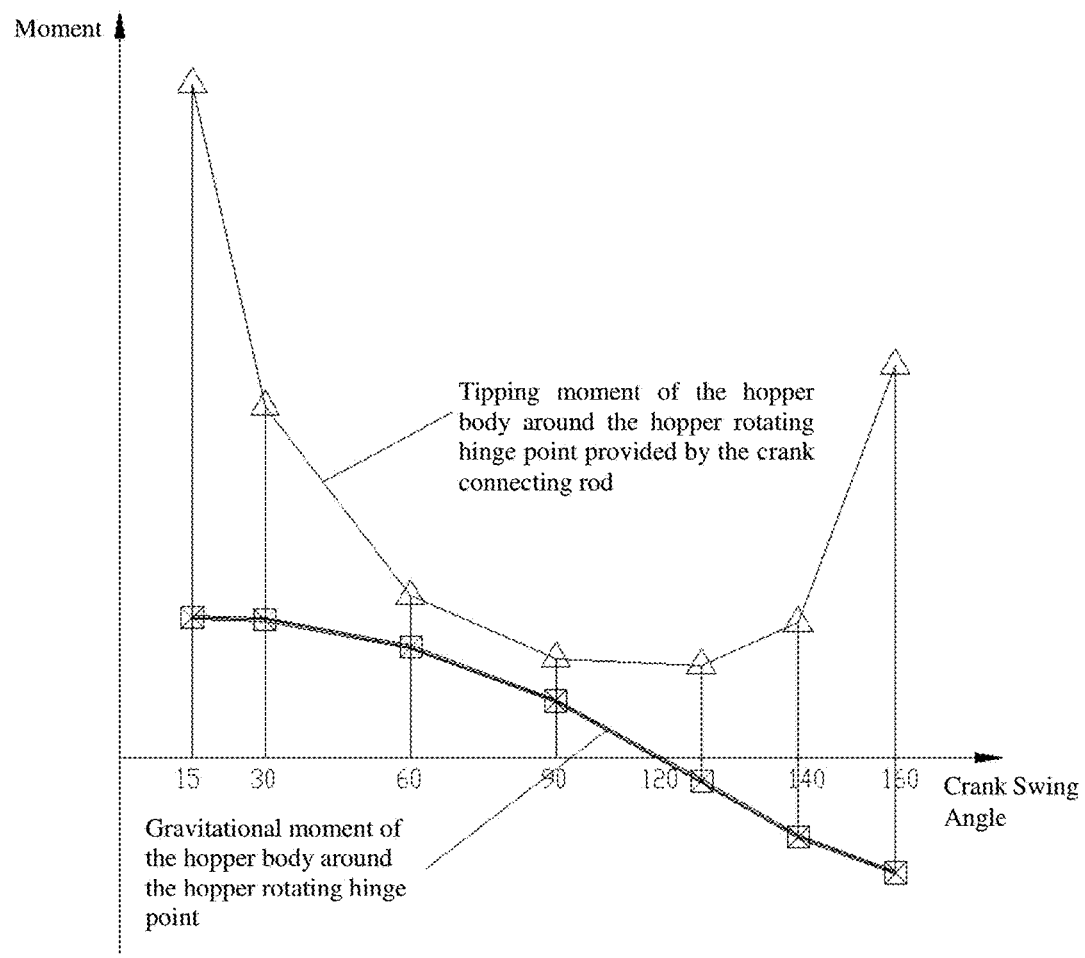
FIG. 4 is a change relationship diagram between a tipping moment of a connecting rod and a gravitational moment of a hopper around a rotating supporting point in multiple positions in a tipping process of a hopper.
Figure 5:
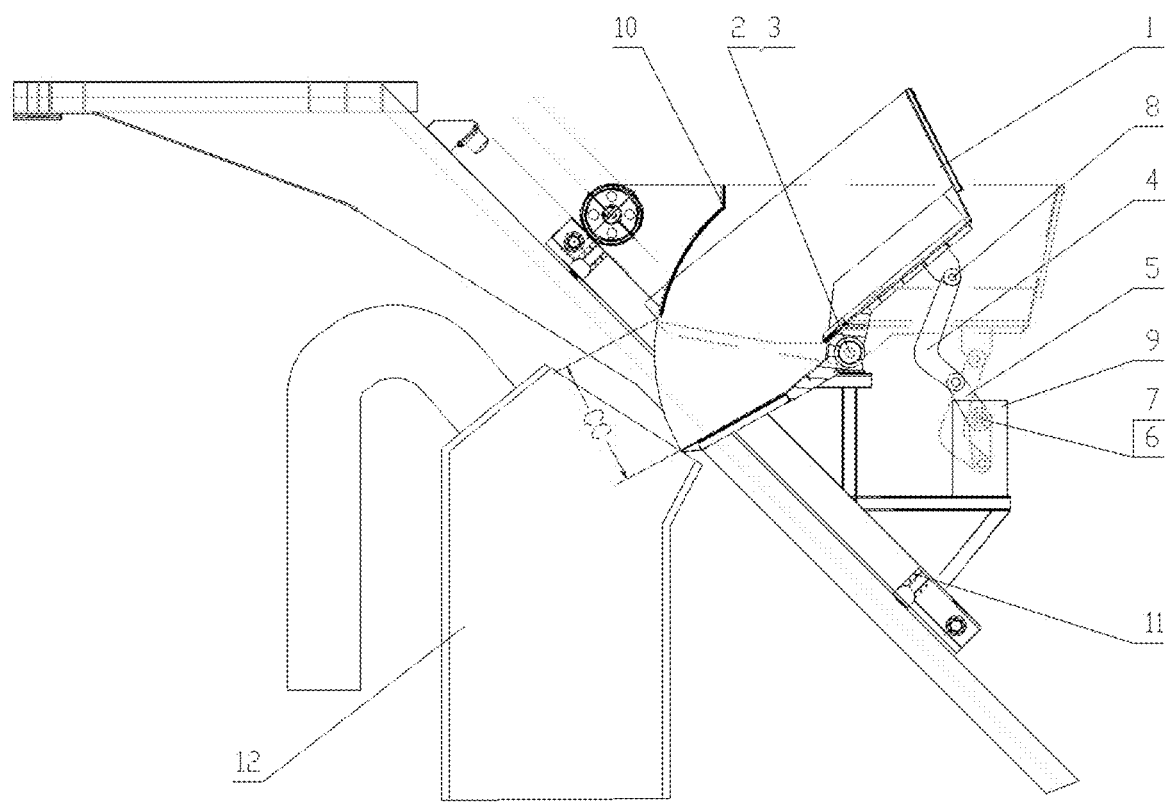
FIG. 5 is a diagram of embodiments when a tipping hopper is on an oblique rail lifting truck in the present invention.

FIG. 4 shows relationships of the tipping moment of the hopper around the hopper rotating hinge point provided by the crank connecting rod and a gravitational moment of the hopper body around the hopper rotating hinge point along with the rotation of the crank.

The gravitational moment of the hopper body 1 is changed (sinusoidally) in the tipping process, while the tipping moment provided by the tipping mechanism is also changed nonlinearly and the tipping mechanism must provide a moment to overcome the gravity so as to tip the hopper. In the tipping mechanism, through optimized design, changes of the tipping moment provided by the tipping mechanism and the gravitational moment of the tipping hopper achieve the same trend (approximate to a resonance phenomenon), thereby reducing motive power of the speed reducer and the motor and decreasing the volume and the weight of the speed reducer.

To reduce the motive power of a prime mover (the speed reducer), a method is to further reduce a distance from the center of gravity to the hopper rotating hinge point. But this practice may generate a negative moment in the tipping process of the hopper body. Although the negative moment is only a change of a moment direction, for a connecting rod tipping system, absolute values of the negative moment and the discharging impact moment shall be controlled within the range of the output moment of the tipping mechanism. In FIG. 4, when the angle is 160°, the output moment of the tipping mechanism is twice of the negative moment of the tipping hopper. As the angle approaches 180°, the safety is enhanced, indicating that the impact resistant capability of the device of the system in the charging and discharging processes is very high.

Finally, it should be noted that the above preferred embodiments are only used for describing the technical solution of the present invention rather than limiting the present invention. Although the present invention is already described in detail through the above preferred embodiments, those skilled in the art shall understand that various changes in form and detail can be made to the present invention without departing from the scope defined by claims of the present invention.

What is claimed is:

1. A tipping hopper, comprising:
   a hopper body and hopper rotating supports, wherein the tipping hopper further comprises a tipping mechanism hinged at a rear of the hopper body;
   the tipping mechanism comprises a connecting rod and a crank;
   one end of the connecting rod is hinged on the hopper body, and the other end is hinged with one end of the crank, and wherein the connecting rod has a bend located between ends of the connecting rod;
   an other end of the crank is hinged on a crank rotating support through a crank rotating shaft;
   a center of gravity of the hopper body is located between a hopper rotating hinge point and a connecting rod support hinge point;
   the hopper rotating hinge point is a hinge point between the hopper body and the hopper rotating supports;
   wherein the connecting rod support hinge point is a hinge point between the connecting rod and the hopper body; and
   a blocking material plate which is fixed in place relative to movements the hopper, such that the material blocking plate is in the same position when the hopper is in either a material receiving position to prevent material from exiting the hopper or in a discharging position to allow material to exit the hopper.

2. The tipping hopper according to claim 1, wherein two groups of hopper rotating supports are symmetrically hinged in middle of the hopper body and located on both sides of the tipping hopper.

3. The tipping hopper according to claim 2, wherein the tipping hopper is configured such that: (1) when the hopper body is in a horizontal state or is in a material receiving position, the crank rotating shaft is located on or near a connecting line of two hinge points on the connecting rod so that the tipping mechanism is in a dead point position; and (2) when the hopper body is in a discharging position, the crank rotating shaft is located on an extension line of a connecting line of two hinge points on the connecting rod so that the tipping mechanism is in another dead point position.

4. The tipping hopper according to claim 1, wherein the bend has concave side that faces towards the crank rotating shaft.

5. The tipping hopper according to claim 4, wherein the tipping hopper is configured such that: (1) when the hopper body is in a horizontal state or is in a material receiving position, the crank rotating shaft is located on a connecting line of two hinge points on the connecting rod so that the tipping mechanism is in a dead point position; and (2) when the hopper body is in a discharging position, the crank rotating shaft is located on an extension line of a connecting line of two hinge points on the connecting rod so that the tipping mechanism is in another dead point position.

6. The tipping hopper according to claim 1, wherein the crank rotating shaft is connected with a torque speed reducer.

7. The tipping hopper according to claim 6, wherein the tipping hopper is configured such that: (1) when the hopper body is in a horizontal state or is in a material receiving position, the crank rotating shaft is located on a connecting line of two hinge points on the connecting rod so that the tipping mechanism is in a dead point position; and (2) when the hopper body is in a discharging position, the crank rotating shaft is located on or an extension line of a connecting line of two hinge points on the connecting rod so that the tipping mechanism is in another dead point position.

8. The tipping hopper according claim 1, wherein the center of gravity of the hopper body is located at the hopper rotating hinge point.

9. A tipping hopper, comprising:
  a hopper body and hopper rotating supports, wherein the tipping hopper further comprises a tipping mechanism hinged at a rear of the hopper body;
  wherein the tipping mechanism comprises a connecting rod and a crank;
  wherein one end of the connecting rod is hinged on the hopper body, and the other end is hinged with one end of the crank, and wherein the connecting rod has a bend located between ends of the connecting rod;
  wherein an other end of the crank is hinged on a crank rotating support through a crank rotating shaft;
  wherein a center of gravity of the hopper body is located between a hopper rotating hinge point and a connecting rod support hinge point;
  wherein the hopper rotating hinge point is a hinge point between the hopper body and the hopper rotating supports;
  wherein the connecting rod support hinge point is a hinge point between the connecting rod and the hopper body;
  wherein the tipping hopper is configured such that: (1) when the hopper body is in a horizontal state or is in a material receiving position, the crank rotating shaft is located on a connecting line of two hinge points on the connecting rod so that the tipping mechanism is in a dead point position; and (2) when the hopper body is in a discharging position, the crank rotating shaft is located on an extension line of a connecting line of two hinge points on the connecting rod so that the tipping mechanism is in another dead point position;
  wherein a center of gravity of a charged hopper is located between the hopper rotating hinge point and the connecting rod support hinge point.

* * * * *